(12) United States Patent
Denton et al.

(10) Patent No.: US 7,438,812 B2
(45) Date of Patent: Oct. 21, 2008

(54) FILTER ELEMENT AND METHOD OF MAKING

(75) Inventors: Donald Ray Denton, Henrvetta, OK (US); Edward Arthur Smallwood, Dewar, OK (US); Kevin Scott O'Meara, Jenks, OK (US)

(73) Assignee: Parker-Hannifin Corporation, Cleveland, OH (US)

( * ) Notice: Subject to any disclaimer, the term of this patent is extended or adjusted under 35 U.S.C. 154(b) by 626 days.

(21) Appl. No.: 09/829,714

(22) Filed: Apr. 10, 2001

(65) Prior Publication Data

US 2002/0144942 A1     Oct. 10, 2002

(51) Int. Cl.
*B01D 27/06*     (2006.01)
(52) U.S. Cl. ............ 210/493.1; 210/493.2; 210/497.01; 210/485; 210/489; 210/DIG. 5; 55/521
(58) Field of Classification Search .............. 210/493.1, 210/493.2, DIG. 5, 497.01, 485, 489; 55/521
See application file for complete search history.

(56) References Cited

U.S. PATENT DOCUMENTS

| | | | | |
|---|---|---|---|---|
| 3,216,578 A | * | 11/1965 | Wright et al. ................ | 210/484 |
| 3,306,794 A | * | 2/1967 | Humbert, Jr. ................ | 156/187 |
| 3,397,793 A | * | 8/1968 | MacDonnell ................ | 210/457 |
| 3,505,794 A | * | 4/1970 | Nutter et al. .................. | 55/487 |
| 3,506,475 A | * | 4/1970 | MacDonnell ................ | 427/285 |
| 3,516,549 A | * | 6/1970 | MacDonnell ................ | 210/351 |
| 3,752,321 A | * | 8/1973 | McLaren ................. | 210/493.1 |
| 4,046,697 A | * | 9/1977 | Briggs et al. ................ | 210/457 |
| 4,464,263 A | * | 8/1984 | Brownell ..................... | 210/484 |
| 4,512,892 A | * | 4/1985 | Ganzi et al. ............. | 210/493.2 |
| 4,588,464 A | * | 5/1986 | Miyagi et al. ................ | 156/218 |
| 4,735,720 A | * | 4/1988 | Kersting ................. | 210/493.5 |
| 5,275,743 A | | 1/1994 | Miller et al. ................. | 210/767 |
| 5,443,724 A | * | 8/1995 | Williamson et al. ....... | 210/323.2 |
| 5,543,047 A | * | 8/1996 | Stoyell et al. ............ | 210/493.2 |
| 5,552,048 A | * | 9/1996 | Miller et al. ................. | 210/489 |
| 5,599,449 A | * | 2/1997 | Gnamm et al. .............. | 210/495 |

(Continued)

FOREIGN PATENT DOCUMENTS

EP     0955078     11/1999

(Continued)

OTHER PUBLICATIONS

European Search Report (EPO Forms 1507.2, 1503, P0459), Jun. 17, 2002.

*Primary Examiner*—Terry K Cecil
(74) *Attorney, Agent, or Firm*—Renner, Otto, Boisselle & Sklar, LLP (57) ABSTRACT

A filter element (10) is provided which can be used to remove microsize contaminant particles (i.e., about 0.5 µm to about 25.0 µm) from aviation fuel. The filter element (10) includes a cylindrical pleated filter media (14) and an exoskeleton support structure (16) supporting the filter media (14). The filter media (14) has a pleat density of about eight to about thirteen pleats per inner diameter inch and is formed only from cellulose-fiber-free and woven-mesh-free layers. The exoskeleton support structure (16) is a screen which is thermally bonded to the pleats' peaks in such a manner that the filter media (14) is sufficiently supported without conventional endoskeleton support layers.

13 Claims, 6 Drawing Sheets

U.S. PATENT DOCUMENTS

| | | | |
|---|---|---|---|
| 5,672,188 A | 9/1997 | Choi | 55/485 |
| 5,690,765 A * | 11/1997 | Stoyell et al. | 156/69 |
| 5,762,796 A * | 6/1998 | Zraik | 156/DIG. 47 |
| 5,814,219 A * | 9/1998 | Friedmann et al. | 210/493.3 |
| 6,099,729 A * | 8/2000 | Cella et al. | 210/315 |
| 6,143,106 A | 11/2000 | Shane | 156/69 |
| 6,165,572 A * | 12/2000 | Kahlbaugh et al. | 428/36.1 |
| 6,206,205 B1 * | 3/2001 | Durre et al. | 210/457 |
| 6,331,223 B1 * | 12/2001 | Wylie et al. | 156/160 |
| 6,332,987 B1 * | 12/2001 | Whitney et al. | 210/799 |
| 6,422,395 B1 * | 7/2002 | Verdegan et al. | 210/411 |
| 6,464,870 B1 * | 10/2002 | Castellanos et al. | 210/243 |
| 2003/0085165 A1 * | 5/2003 | Shane | 210/85 |

FOREIGN PATENT DOCUMENTS

| | | | |
|---|---|---|---|
| EP | 1057520 | | 12/2000 |
| WO | WO97/31695 | * | 9/1997 |
| WO | WO 98/14257 | * | 4/1998 |
| WO | 00/62899 | | 10/2000 |

* cited by examiner

FILTER ELEMENT AND METHOD OF MAKING

FIELD OF THE INVENTION

The present invention relates generally as indicated to a filter element and, more particularly, to a microfilter element which is constructed to continuously remove microsize impurity particles (e.g., about 0.5 µm to about 25.0 µm) from aviation fuel.

BACKGROUND OF THE INVENTION

In a typical filter assembly, a filter element is located within a housing in such a manner that the relevant fluid flows through the filter element and particles are removed therefrom. In one known type of filter element, the filter media comprises a cylindrical construction of pleated material. The filter element can be coreless (i.e., the media's inner radius is self-supporting and received over a support tube integral with the filter housing) or it can include an integral support tube.

A cylindrical pleated filter media is usually made by folding media material into a plurality of longitudinally-extending pleats. The folded media is then shaped into a cylinder with the end pleats being positioned circumferentially adjacent each other. A side seam is then formed between the end pleats to maintain the media in the cylindrical shape. In this shape, the pleats have radially-inner peaks defining an inner diameter, radially-outer peaks defining an outer diameter, and side walls extending therebetween.

The cylindrical filter media can then be mounted over its inner core (if it has one), and end caps can be attached to the opposite axial ends of the filter media. The fluid to be filtered typically passes radially inward through the filter media and then outward through an opening in one of the end caps to an outlet passage in the housing. This radially inward flow direction is usually the most advantageous for efficient filtering, although it could conceivably be more beneficial for the fluid to pass radially outward through the pleated media in certain filtering and/or coalescing situations.

It is important that the pleats of the filter media be able to withstand the pressure of fluid flowing therethrough. If the pleats become deformed (e.g., folded-over and/or bunched against one another), the filtering surface area of the pleats is reduced and the useful life of the filter element is significantly shortened. Accordingly, almost all pleated filter media contain some type of support mechanism for preventing deformation of the pleats. The support mechanism have conventionally been pleatable "endoskeleton" layers incorporated into the pleated media (i.e., resin-reinforced, cellulose-fiber, woven mesh layers) and/or rigid "exoskeleton" structures surrounding the pleated media (i.e., metal cages or rings). Non-rigid exoskeleton support structures, such as spiral wraps and flexible sleeves have also been used in conjunction with pleatable endoskeleton layers.

It is also important that the side seam in the filter media remain structurally sound throughout the filter's life. Any rips or tears in this seam provide bypass flow passages for the fluid thereby compromising the filter's efficiency and perhaps even forfeiting its usefulness. That being said, the side seam construction must also be designed to avoid the sacrifice of precious flow area through the filter media. Depending upon the filtering situation, the optimum side seam construction can be accomplished by sewing, gluing, taping, and/or mechanically clipping the end pleats together.

Of particular relevance to the present invention is a cylindrical filter assembly used to remove impurities in aviation jet fuel handling systems. Such a filter assembly, known in the industry as an aviation fuel microfilter, has a cylindrical filter media constructed to continuously remove dirt of a minimum particle size (about 0.5 µm to about 25.0 µm) from the aviation fuel. This type of high efficiency microfilter element has traditionally included a filter media having an endoskeleton structure with support layers predominantly made up of cellulose fibers.

The Institute of Petroleum has published recommended minimum performance and mechanical specifications for aviation jet fuel microfilters. These specifications include contaminant removal efficiency (e.g., less than 0.15 mg/l particles greater in size than the stated filter rating and maintained up to a differential pressure of 1.5 bar), media migration (e.g., less than 10 fibers per liter), flow rate (e.g., 10 liters/second per meter of effective media length), differential pressure (e.g., at qualification flow rate with clean, dry fuel), and structural strength (e.g., capable of withstanding a differential pressure of 5 bar (72.5 psi) without element rupture or bypassing of seals). The microfilter specifications have been reviewed and accepted by the major aviation fuel companies and microfilter manufactures are expected to satisfy the specifications.

SUMMARY OF THE INVENTION

The present invention provides a filter element that can be constructed to not only meet the recommended microfilter specifications of the Institute of Petroleum, but to also have a longer life and higher efficiency than conventional aviation fuel microfilters satisfying these specifications.

Particularly, the present invention provides a unique exoskeleton pleat support structure which eliminates the need for cellulose-fiber layers in the pleated media. By eliminating conventional endoskeleton support layers, an increased pleat density is possible which translates into a higher contaminant removal efficiency. Also, a cellulose-fiber-free filter composition eliminates the moisture related problems (e.g., fiber swelling and subsequent pleat deformation) which are associated with cellulose fibers and which are known to dramatically reduce filter life.

More particularly, the present invention provides a filter element comprising a pleated cylindrical filter media and an exoskeleton support structure surrounding the filter media. The filter media is formed from only cellulose-fiber-free and woven-mesh-free layers, for example, a microglass filtration layer and non-woven polymeric inner and outer layers. The exoskeleton support structure is attached to the pleats' radially-outer peaks in such a manner that the cylindrical filter media is sufficiently supported without having cellulose-fiber and/or woven-mesh layers. This multi-layer filter media can have a pleat density of about 8 or more pleats per inner diameter inch, about 10 or more pleats per inner diameter inch, about 12 or more pleats per inner diameter inch, and/or about 13 pleats per inner diameter inch.

The exoskeleton support structure can comprise a support screen comprising a first set of cords which extend in a first direction, a second set of cords which extend in a second direction and which intersect with the first set of cords, and a grid of openings which is defined therebetween. The cords are attached to the radially-outer peaks thereby exoskeletonally supporting the pleats in an appropriately spaced and non-collapsed condition. The distance between adjacent cords is preferably about half to about twice the distance between adjacent radially-outer peaks so that fluid flow is not restricted through the screen while still providing a sufficiently tight array of peak attachment (e.g., about 20 to about 7 attachment points per inch) are provided.

The support screen can be formed from a flexible thermal-bondable mesh material (PVC-coated fiberglass) whereby it can be non-adhesively attached to the filter pleats by thermal bonding. This construction allows for easy assembly of the support screen by wrapping an appropriately sized sheet of screen material around the filter media and then thermally bonding the screen material to the radially-outer peaks to form the support screen. Also, a side seam can be easily formed for the support screen by thermally bonding overlapping lateral edges of the sheet during this same process.

According to another aspect of the present invention, there is provided an improved seam construction for a filter media that enhances efficiency and structural integrity of the filter element. Instead of only attaching or bonding certain layers of end pleats in the filter media, the present invention includes all of the relevant layers in the adhesive seam. This minimizes the potential for both interlayer and inter-wall leakage.

More particularly, the present invention provides a filter media comprising a plurality of longitudinally-extending pleats including two end pleats and a side seam joining together the end pleats. The end pleats are positioned with their endmost sidewalls adjacent each other and an adhesive bead extends between and around these sidewalls to encapsulate all of the layers therein. Such a seam construction can be accomplished by placing the end pleats in a fixture having two slots separated by a dividing wall. The dividing wall positions the sidewalls of the end pleats so that there is an outwardly opening flow space available therebetween. An adhesive is then applied along the length of the edges of the end pleats to form the adhesive bead.

When the unique exoskeleton pleat support structure and the side seam construction of the present invention are incorporated into an aviation fuel microfilter, the result is a dramatic improvement in filter life and improved element efficiency over traditional designs. These and other features of the invention are fully described and particularly pointed out in the claims. The following description and drawings set forth in detail a certain illustrative embodiment of the invention, this embodiment being indicative of but one of the various ways in which the principles of the invention may be employed.

DETAILED DESCRIPTION

Figure 1:
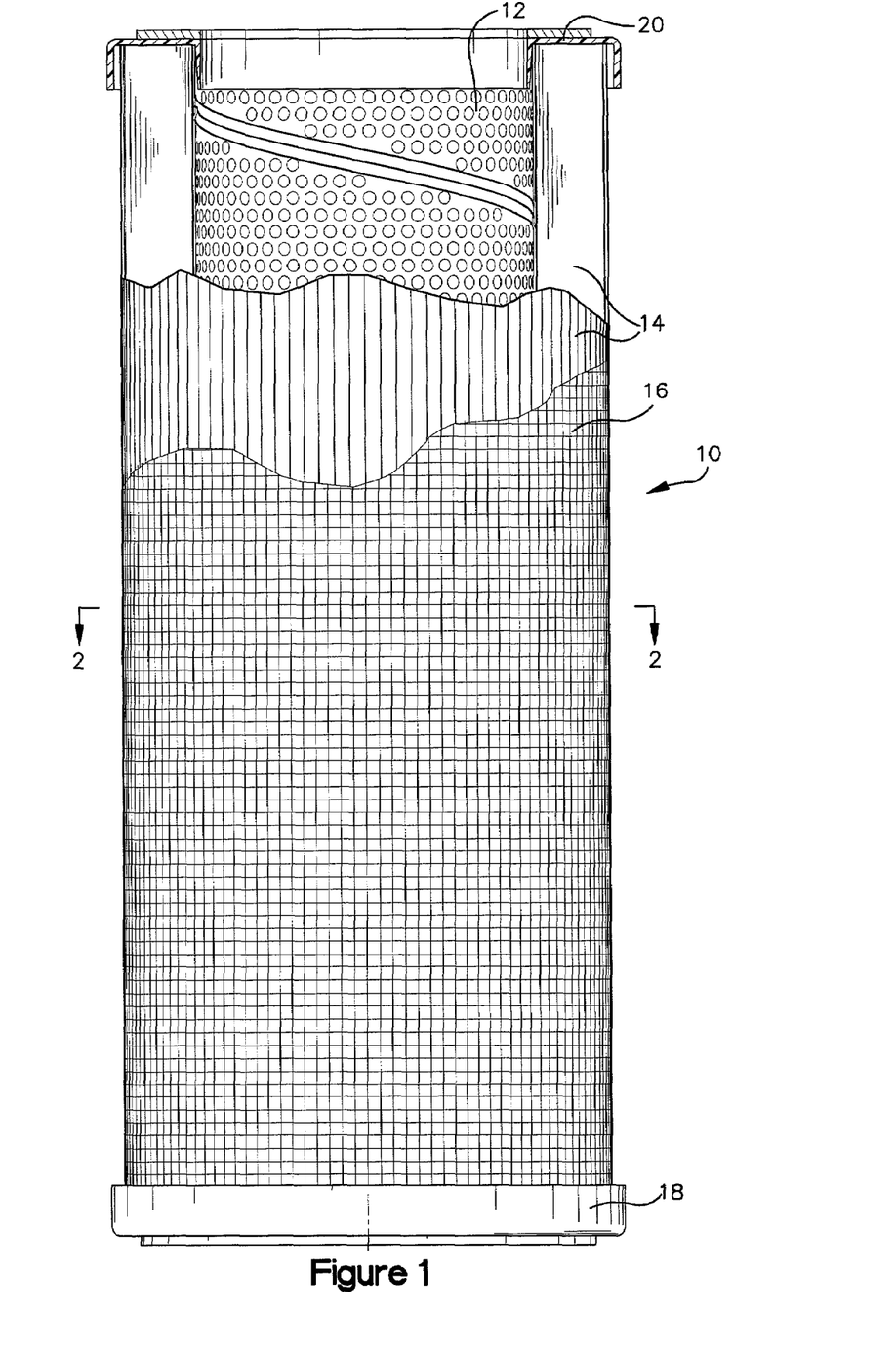
FIG. 1 is a side elevational view of a filter element according to the present invention, with certain portions removed and/or shown in section.
Figure 2:
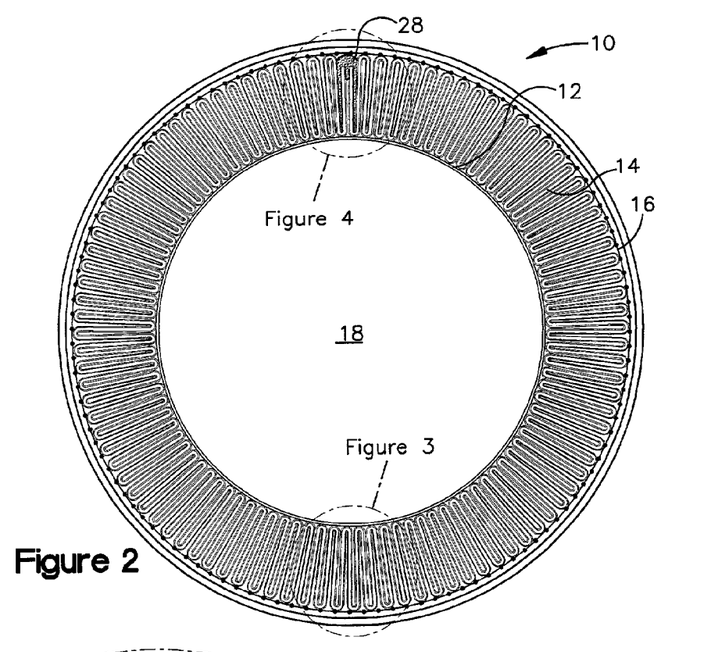
FIG. 2 is a sectional view of the filter element as seen along line 2-2 in FIG. 1.

Referring now to the drawings in detail, and initially to FIGS. 1 and 2, a filter element 10 according to the present invention is shown. The filter element 10 includes a center tube 12, a cylindrical pleated filter media 14 circumscribing the central tube 12, an outer support screen 16, and a pair of end caps 18 and 20. The illustrated filter element 10 can be an aviation fuel microfilter element wherein the fuel flows inwardly through the pleated filter media 14 to continuously remove microsize particles (about 0.5 µm to about 25.0 µm) from the aviation fuel. According to the present invention, such a microfilter element can be constructed to meet and exceed the recommended minimum performance and mechanical specifications of the Institute of Petroleum.

The center tube 12 preferably has a cylindrical shape and is of an essentially conventional center tube construction. For example, the tube 12 can be made from a sheet of any suitable material, such as perforated steel. It should be noted that a coreless filter element (i.e., one which is self-supporting and is received over a support tube in the filter housing) is possible with, and contemplated by, the present invention.

Figures 3, 3A:
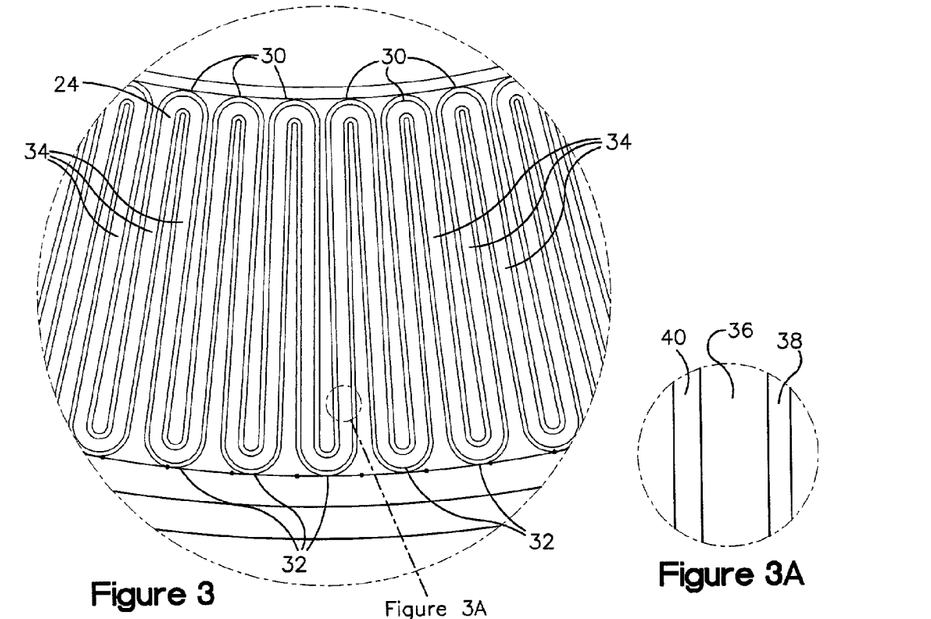
FIG. 3 is a schematic close-up sectional view of the pleats of the filter media.
FIG. 3A is a schematic close-up sectional view of the layers of the filter media.

Referring now to FIG. 3, the filter media 14 includes a plurality of pleats 24 including two end pleats 26 joined together by a side seam 28. The pleats 24/26 include radially inward peaks 30, radially outward peaks 32, and sidewalls 34 therebetween. In the illustrated embodiment, the pleats 24/26 are generally aligned with the radial dimension of the filter element 10. The number and dimension of the pleats can vary depending upon the particular application. That being said, one advantage of the present invention is that it allows a significant increase in pleat density over conventional designs, as is explained in more detail below.

Referring now to FIG. 3A, the filter media 14 is formed from a multilayer material comprising a filtration layer 36 sandwiched between outer and inner layers 38 and 40. The filter media 14 can be made by compiling these layers 36, 38 and 40 into an appropriately sized sheet and then folding the sheet either by hand or machine to form the pleats 24/26. The folded sheet can then be formed into a cylindrical shape with its end pleats 26 being joined together at the seam 28 to maintain this geometry.

The intermediate filtration layer 36 is made of a material which is resistant to the filtering environment, has an appropriate thickness, provides an acceptable filtering efficiency and is compatible with desired pleating procedures. For aviation fuel and/or other hydrocarbon filtering situations, wet-laid fiberglass (e.g., borosilicate microglass fibers with acrylic binder) having a thickness in the range of about 0.015 inch to about 0.035 inch and a filtering efficiency of about 0.5 µm to about 25.0 µm would be a desirable candidate. Polymer materials, such as nylons, polyamides, polyesters, polyethylenes, polypropylenes and/or mixtures thereof could be used instead of microglass if more desirable for the relevant hydrocarbon filtering situation. The above polymers could be melt blown or otherwise processed to provide the desired filtering characteristics.

The outer and inner layers 38 and 40 are each made of material which is resistant to the filtering environment, has sufficient strength characteristics at a thickness substantially less than conventional corrugated cellulose-fiber layers (e.g., less than about 0.030 inch to about 0.060 inch), is non-abrasive to the filtration layer 36, and is compatible with desired pleating procedures. For aviation fuel and/or other hydrocarbon filtering situations, a porous polymeric non-woven material having a thickness in the range of about 0.008 inch to about 0.017 inch would be appropriate, such as the calendared polyester spun-bonded materials available from Reemay, Inc. under the Reemay™ trademark. For example, the outer (or upstream) layer 38 could be $^{10}/_{1000}$ inch thick layer of Reemay™ 2014 and the inner (or downstream) layer 40 could be a $^{12}/_{1000}$ inch thick layer of Reemay™ 2024. The outer layer 38 and/or the inner layer 40 could also be a nylon non-woven material, such as that available from Fiberweb North America Inc. under the trade designation Cerex. Also, instead of non-woven materials, the inner and outer layers 38 and 40 could instead be made of woven nylon or woven polyester, although these woven materials are usually more expensive than the non-woven alternatives and usually substantially thicker whereby they can negatively impact pleat density.

In the illustrated embodiment, the filter media 14 includes only the three layers 36, 38 and 40. However, depending upon the filtering situation, multiple filtration layers, outer layers, and/or inner layers could be used. That being said, one advantage of the illustrated three-layer media material is that it has reduced bulk when compared to conventional media material which can provide certain advantages in filter construction.

As is explained in more detail below, the unique exoskeleton pleat support structure provided by the filter's screen 16 eliminates the need for cellulose-fiber layers and/or woven mesh layers in the pleated filter media 14. By eliminating these conventional endoskeleton layers, and using instead the three-layer filter media 14, an increased pleat density, and thus a higher contaminant removal efficiency, is possible with the present invention. For example, the cellulose-fiber-free filter media 14 can have a pleat density of about 8 or more per inner diameter inch, about 10 or more pleats per inner diameter inch, about 12 or more pleats per inner diameter inch, and/or about 13 pleats per inner diameter inch. By way of comparison, conventional multi-layer aviation fuel microfilters have had pleat densities in the range of 3 to 6 pleats per inner diameter inch.

Also, the cellulose-fiber-free nature of the filter media 14 eliminates the moisture-induced problems constantly plaguing cellulose fiber filters. Specifically, in the presence of water (almost always present in hydrocarbon fuel streams), cellulose fibers swell and cause pleat deformation thereby dramatically reducing filter life. The elimination of these cellulose-related problems, in combination with the other structural aspects of the invention, is believed to approximately triple the life of the filter element 10. Thus, not only can the filter media 14 of the present invention provide a microfilter element with a higher efficiency rating, but also a longer life.

As was explained above, the three-layer and cellulose-fiber free construction of the filter media 14 afforded by the exoskeleton pleat support 16 allows for an increased pleat density. It may be noted, however, that the screen 16 can also be used with a single-layer filter media consisting essentially of, for example, a single filter layer made of corrugated cellulose. In such a single-layer media construction, pleat densities in the range of 10 pleats per inner diameter inch are possible.

Figure 4:
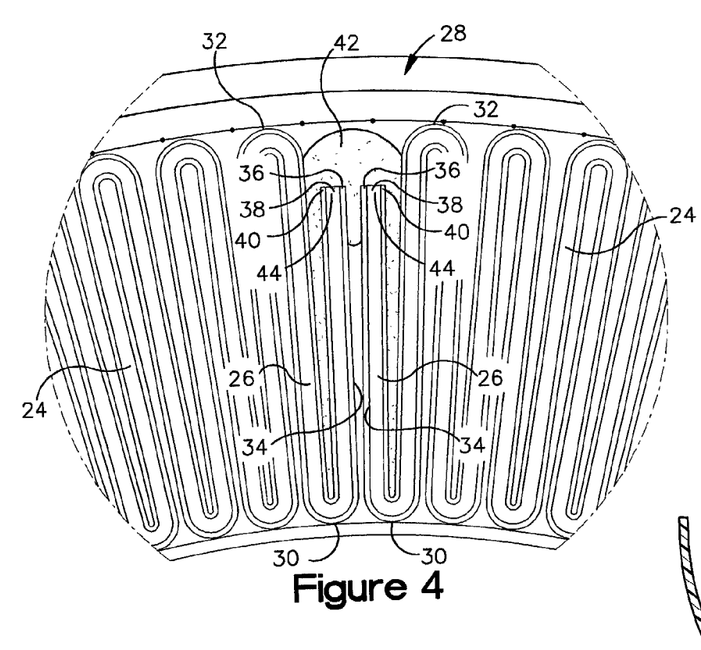
FIG. 4 is a schematic close-up view of a side seam of the filter media.

Referring now to FIG. 4, the side seam 28 of the filter media 14 is shown in detail. As was briefly explained above, the side seam 28 joins together the end pleats 26 to thereby complete, or secure, the cylindrical geometry of the filter media 14. To this end, the side seam 28 extends the length of the filter media 14, securely attaches the end pleats 26 together, and sacrifices only a minimal amount of flow area. The side seam 28 can comprise an adhesive bead 42 which completely encapsulates all of the layers 36, 38 and 40 of each of the end pleats 26. The bead 42 can be formed from a two-part adhesive (e.g., polyurethane adhesive) or any other appropriate adhesive which can be controllably applied to the seam.

In the illustrated side seam 28, the portions of the inner layer 40 on the endmost sidewalls 34 are positioned adjacent each other with their distal ends 44 being located radially outward relative to the endmost inward peaks 30. The adhesive bead 42 extends circumferentially between the endmost radially outward peaks 32 of the two end pleats 26. The adhesive bead 42 also extends radially inward between the adjacent inner layers 40 of the two end pleats 26 and between adjacent portions of the outer layer 38 in each of the end pleats.

The encapsulation of all of the layers by the adhesive bead 42 is believed to provide a strong leak-free seam construction. By way of comparison, when only the two endmost sidewalls are joined together by tape, the outermost layers must absorb the tension of the seam. This can lead to separation between the layers attached thereto and a corresponding sacrifice of efficiency. Alternatively, when the endmost sidewalls are not directly joined together, the surface area of the adhesive is substantially reduced. Thus, by minimizing the potential for interlayer and inter-wall separation, the seam 28 enhances the efficiency and the structural integrity of the filter element 10.

Figure 5:
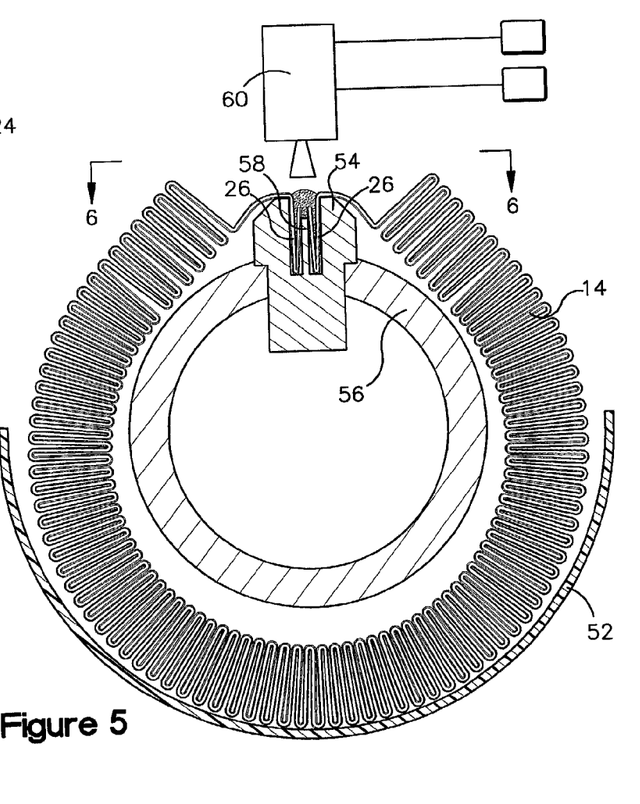
FIGS. 5 and 6 are respectively schematic end and side views of a device for forming the side seam in the filter media.
Figure 6:
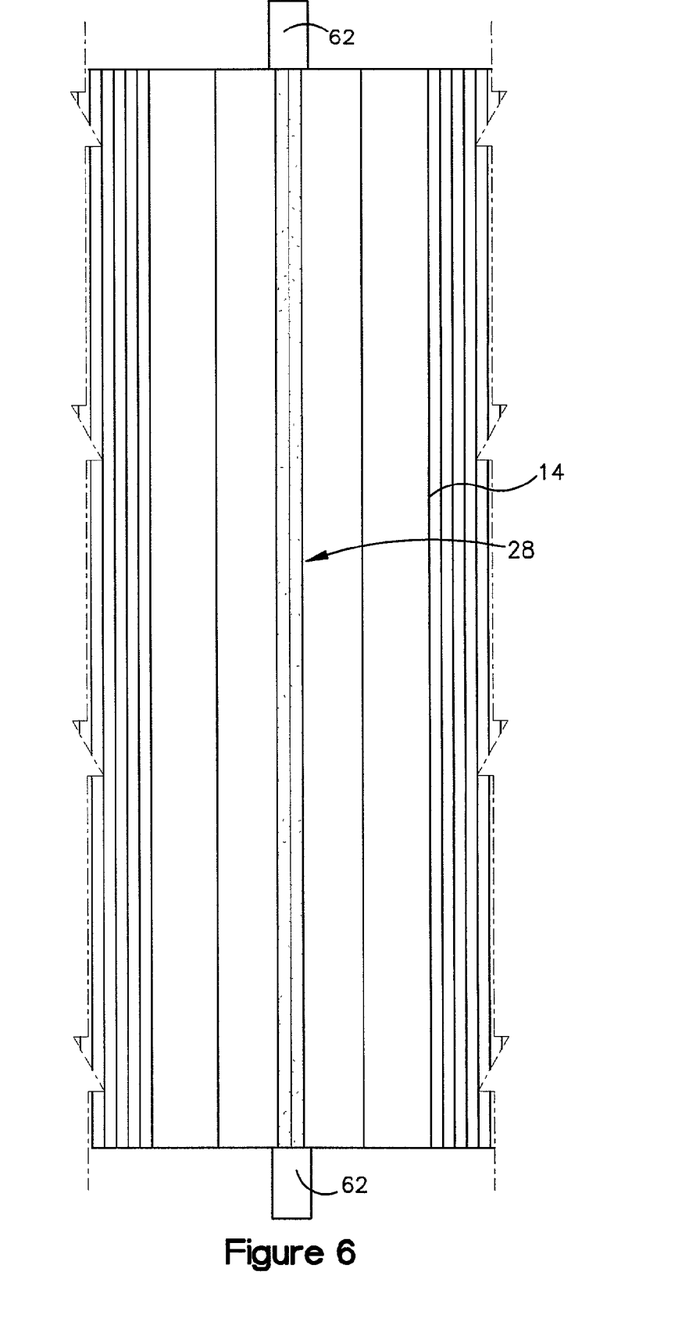

Referring now to FIGS. 5 and 6, a device 50 for forming the filter media's side seam 28 is schematically shown. The device 50 comprises a cantilevered cradle 52 and a fixture 54 mounted on a mandrel 56. The fixture 54 includes a cavity with a dividing wall 58 forming two slots sized to respectively receive each of the end pleats 26 in the illustrated manner.

As was explained above, the filter media 14 can be made by compiling its layers into an appropriately sized sheet and then folding the sheet either by hand or machine to co-pleat the layers into the pleats 24/26. This folded sheet can then be placed in the cradle 52 and the end pleats 26 appropriately positioned in the slots of the fixture 54. Specifically, the end pleats 26 are positioned so that upwardly opening flow spaces are available between the different adjacent sidewalls. A dispenser 60, which can be a handheld unit connected to a metering pump apparatus, is then used to apply a two-part adhesive (e.g., polyurethane adhesive) along the length of the edges of the end pleats 26 to form the adhesive bead 42. Stop clips 62 can be removably placed at the two axial ends of the pleats 26 to allow the adhesive to extend along the entire seam area without spilling thereover.

While the illustrated construction of seam 28 is very advantageous with multilayer filter media, this construction could also provide benefits in a single layer situation. In such situation, the adhesive bead 42 could still extend radially inward between the endmost sidewalls and circumferentially between endmost radially outward peaks of the two end pleats 26. Thus, the seam 28 can have significant structural advantages regardless of the media's multi-layerness.

Figure 7:
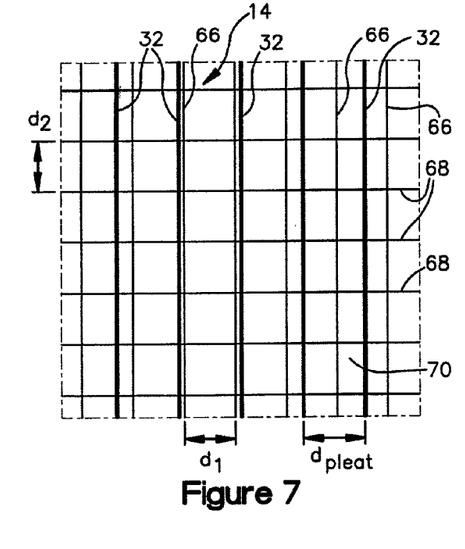
FIG. 7 is a schematic close-up view of the support screen overlying the filter media.

Referring now to FIG. 7, the support screen 16 and how it forms an exoskeleton structure for the filter media 14 is schematically shown. The support screen 16 comprises a first set of cords 66 extending in a first direction, a second set of cords 68 extending in a second direction and intersecting with the first set of cords 66, and a grid of openings 70 defined therebetween. Adjacent cords 66 are separated from each other by a distance $d_1$ and adjacent cords 68 are separated from each other by a distance $d_2$. In the illustrated embodiment, the first set of cords 66 extend substantially parallel with the longitudinal dimension of the pleated media 14 and the second set of cords 68 extend substantially perpendicular thereto. Also in the illustrated embodiment, the distances $d_1$ and $d_2$ are approximately equal whereby the openings 70 are square in shape.

The thickness of the cords 66/68 and the cord-to-cord spacing can be such that the screen 16 provides no significant resistance to flow therethrough. In other words, the screen 16 is not intended to provide any type of filtering function and thus the openings 70 can be magnitudes larger than the expected contaminant size (e.g., about 0.5 μm to about 25.0 μm). For example, the screen 16 can provide an open area of about 50% or greater, about 60% or greater, and/or about 70% or greater.

The cords 66/68 are attached to the pleats' radially outer peaks 32 thereby exoskeletonally supporting the pleats 24 in the desired spaced and non-collapsed condition. To this end, while the cords 66/68 should be spaced far enough apart to encourage fluid flow through the screen 16, they should also be spaced close enough together to provide sufficient peak attachment points. To this end, the cross-sectional dimension (e.g., diameter) of the cords 66/68 can be in the range of about 0.008 inch to about 0.020 inch and the distance $d_1$ between the cords 66 can be about half to about twice the distance $d_{pleat}$ between adjacent peak pleats 32.

Additionally or alternatively, the distance $d_1$ between the cords 66 can be between about 0.05 inch and 0.15 inch. The distance $d_2$ between the cords 68 can be approximately equal to the distance $d_1$ (as shown) and/or can be about half to about twice the distance $d_1$. In an aviation fuel microfilter, the screen 16 could have, for example, 0.013 inch diameter cords and approximately 10 cords per inch thereby providing an array of 0.090 inch×0.090 inch square openings 70. This provides an approximately 75% open area through the screen 16 while providing a uniform array of attachment points and/or lines on the filter media 14.

It may be noted that although the screen 16 may have a variety of cord-to-cord orientations and/or screen-to-pleat alignments, the illustrated filter-aligned x-y grid orientation has been found to provide an extremely uniform and effective attachment array. In the denser pleat configurations possible with the present invention (e.g., about 8 to about 16 pleats or more per inner diameter inch), the cords 68 can provide about 7 to about 20 attachment points per axial inch on the radially outer peak 32 of each and every pleat 24.

In the preferred embodiment, the cords 66 are generally aligned with the axis of the filter media 14 whereby some of these cords could be coincidently radially aligned with the small gap between adjacent pleats 24 and thus not attached to an outer peak 32. Moreover, an exact alignment is not expected whereby some of the cords 66 will wander slightly relative to the line of the closest peak 32. However, most of the cords 66 will have many attachment points per pleat and some even providing a continuous attachment line along a portion of the peak surface. Furthermore, even the unattached cord portions will extend between cord attachment points and thereby form an array of exoskeleton braces therebetween.

The cords of the screen 16 can be attached to the pleats' peaks 32 by adhesive, welding, thermal bonding or any other suitable method. However, it may be noted that a non-adhesive attachment method advantageously eliminates the risk of adhesive drip beyond the attachment points, as dried/cured drip spots can undesirably reduce the flow area into the filter media 14. To this end, the screen 16 can be made from a material which can be thermally bonded to the pleats' peaks 32, such as a PVC coated fiberglass mesh.

Figure 8:
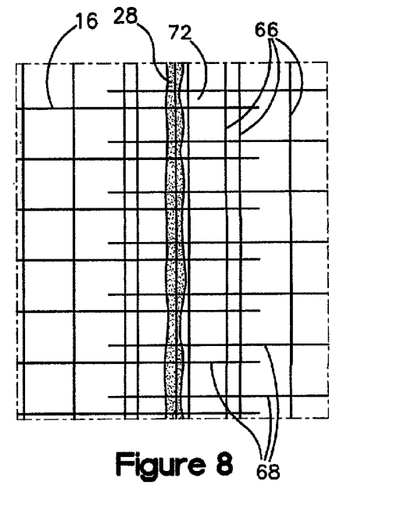
FIG. 8 is a schematic close-up view of a side seam of the support screen.

Referring now to FIG. 8, a side seam 72 in the support screen 16 is shown in detail. In the illustrated embodiment, the cords 66 and 68 are interwoven in a sheet which has lateral edges joined together at the side seam 72. Thermal bonding of the screen's lateral edges together (when an appropriate material is used) to form the side seam 72 has proven satisfactory in aviation fuel microfilters. Specifically, only a slight overlap of the edges is necessary (e.g., less than an inch) to assure structural integrity of the exoskeleton and an acceptable minimal loss of flow area. In the illustrated embodiment, the side seam 72 of the support screen 16 is formed over the side seam 28 of the filter media 14.

The single side seam construction of the support screen 16 allows a uniform attachment array using standard x-y screen material which would not be possible with, for example, a spiral wrap of a mesh material. Moreover, this single-seam construction allows an uncomplicated assembly of this component of the filter element 10 when a flexible screen material with thermal bonding potential (e.g., the PVC coated fiberglass mesh discussed above) is used.

Figure 9A:
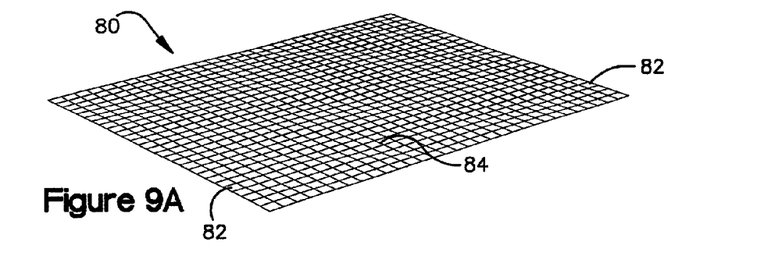
FIGS. 9A, 9B, 9C are schematic views illustrating the assembly of the support screen to the filter media.
Figure 9B:
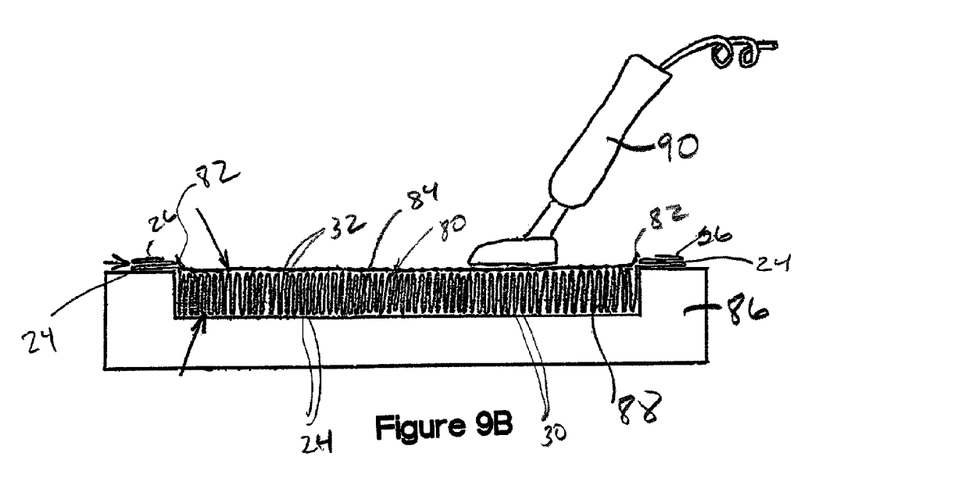
Figure 9C:
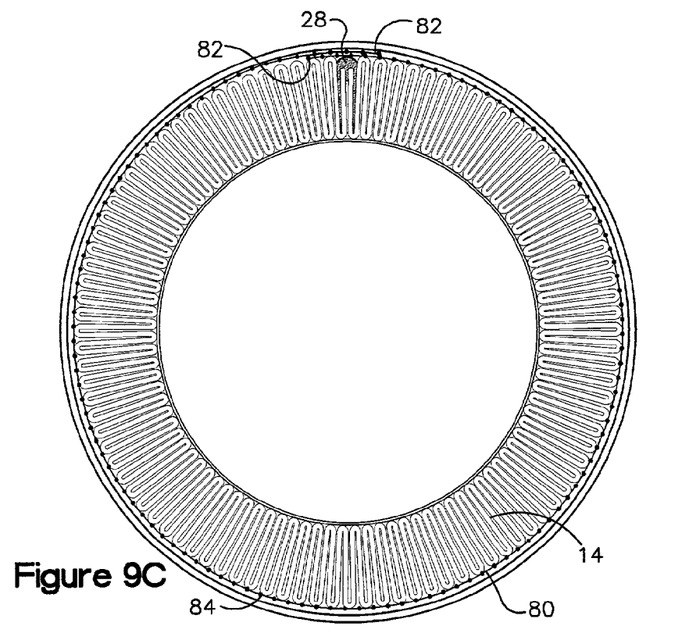

The support screen 16 can be assembled on the filter media 14 as shown schematically in FIGS. 9A-9C. Initially, a screen material 80 is provided which is compatible with thermal bonding (e.g., a PVC coated fiberglass mesh) and which has dimensions corresponding to those of the filter media 14. That is, the screen material 80 has a width corresponding to the axial length of the filter media 14 and a length corresponding to the circumference of the filter media 14 plus the length necessary for the seam overlap. To this end, the material 80 can be provided in roll form and cut to the appropriate width/length or can be provided in pre-cut sheets that are generally rectangular, square, or otherwise shaped (e.g., parallelogram). In any event, the sheet of screen material 80 can be viewed as having two lateral end sections 82 which overlap to form the seam 72 and a section 84 therebetween. (FIG. 9A.)

A fixture block 86 is provided for application of the screen material 80 to the filter media, this bock 86 having a pocket 88 with dimensions corresponding to the cylindrical shape of the filter media. Specifically, the pocket 88 has a width corresponding to the outside circumference of the cylinder and a length corresponding to its axial length. The filter media's pleats 24 are placed within the pocket 88 except that the end pleats 26 and one adjacent pleat 24 are positioned on the lateral edges around the pocket 88. A heat/pressure device, such as the illustrated constant heat iron 90, can then be used to thermally bond the section 84 of the screen material 80 to the pocketed pleats of the filter media. (FIG. 9B.) The end sections 82 of the screen material are not yet bonded to the filter media.

The side seam 28 can then be formed in the filter media 14 as is shown in FIGS. 5 and 6 or by any other suitable manner. It may be noted, however, the screen material 80 not being bonded to the end pleats 26 prior to formation of the side seam 28 will usually facilitate this formation. In any event, after the filter media 14 assumes its cylindrical shape, the end sections 82 are overlapped and thermal bonded together to form the support screen's side seam 72. (FIG. 9C.) Additionally ironing steps can be performed if necessary.

The illustrated method of attaching a majority of the screen material 80 to the filter media 14 prior to it assuming a cylindrical shape can provide several advantages. For example, the bonding of the pleats 24 in the desired spacing arrangement adds protection and structure during the forming of the filter media's side seam 28. Also, the bonding of the pleats 24 in a non-cylindrical configuration eliminates the need for manufacturing devices that are adaptable to accommodate different filter diameters. Furthermore, the bonding of the screen material 80 to the pre-cylindrical pleats 24 has been found to decrease interlayer separation in the filter media 14 because the thermal bond is more likely to creep into the underlying layers thereby securing them to each other.

The end caps 18 and 20 have a standard design and can be made of any appropriate impervious material, such as rigid plastic, which is compatible with the fluid to be filtered. The end caps 18 and 20 are bonded to the ends of the filter media 14 with an adhesive or by other appropriate means. The adhesive can be applied across the entire annular end of the pleated media to also bond thereto the axial ends of the support screen 16 as well as the axial ends of the center tube 12 (if present). The filter element 10 is then complete and ready for use in the desired filtering situation.

Figure 10:
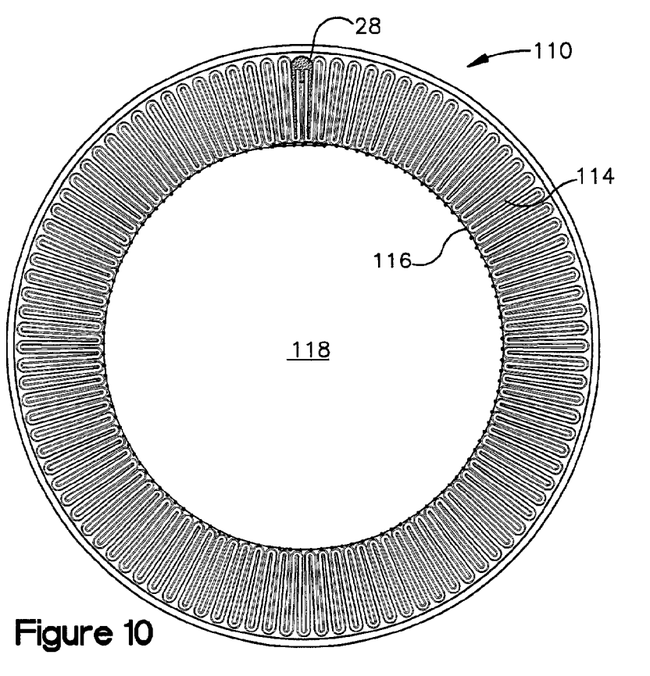
FIG. 10 is a sectional view of another filter element according to the present invention.

Referring now to FIG. 10, another filter element 110 according to the present invention is shown. The filter element 110 includes a cylindrical pleated filter media 114, a support screen 116, and end caps 118. The filter media 114 and the end caps can be essentially the same as the corresponding components in the filter element 10. The support screen 116 has many of the same characteristics as the support screen 16, but it is instead attached to the radially inner peaks of the filter pleats. The support screen 116 can be made of the same material and assembled to the filter media 114 in the same manner as the support screen 16, except that the pocket 88 of the fixture block 86 would have a width corresponding to the inner circumference of the filter media 114 in its cylindrical shape.

The radially inward exoskeleton structure provided by the support screen 116 has been found to be very beneficial in filtering situations where fluid flows outwardly, rather than inwardly, through the filter media 114. One particular application in connection with aviation fuel is a coalescer element for removing free water and particulates from the fuel stream. In any event, it may be noted that the filter element 110 does not include a center tube and, in contrast to conventional "coreless" constructions, does not necessarily require a support tube in the filter housing. For this and other reasons, it could be advantageous to use the radially inward support screen 116 in combination with the radial outward support screen 16 in certain filtering situations.

One may now appreciate that the present invention provides a filter element 10/110 wherein the unique exoskeleton pleat support structure 16/116 eliminates the need for endoskeleton support layers in the pleated filter media 14/114 thereby allowing an increased pleat density. One may additionally or alternatively appreciate that the present invention provides an improved filter media side seam 28 that enhances efficiency and structural integrity. When this pleat support structure and this side seam construction are incorporated into a filter element, the result is a dramatic improvement in microfilter life and improved element efficiency over traditional designs.

In the description of the invention, the importance of the design of the filter element with respect to aviation fuel microfilters has been repeatedly stressed. The reason for this emphasis is that principles of the invention quite significantly allow the construction of an aviation fuel microfilter that not only meets recommended microfilter specifications of the Institute of Petroleum, but which also has a longer life and higher efficiency than conventional qualifying microfilters. That being said, the principles of the present invention can be employed together or separately in other types of filter elements. By way of example, in certain situations, the support screen 16/116 might serve a necessary purpose even if the filter media 14/114 does include cellulose-fiber or woven-mesh support layers (e.g., a single layer filter media construction). By way of another example, the cellulose-fiber-free and woven-mesh-free filter media 14/114 might be advantageous even if a high pleat density is not desired. By way of a further example, the construction of the side seam 28 could be incorporated into almost any cylindrical filter media. Although the invention has been shown and described with respect to a certain preferred embodiment, it is obvious that equivalent and obvious alterations and modifications will occur to others skilled in the art upon the reading and understanding of this specification.

The invention claimed is:

1. A filter element comprising a cylindrical filter media and an exoskeleton for the filter media;
   the filter media being formed from only cellulose-fiber-free and woven-mesh-free layers which are folded to form a plurality of longitudinally-extending pleats having radially inner-peaks defining an inner diameter and radially-outer peaks defining an outer diameter;
   the exoskeleton comprising a support screen thermally bonded to the radially-outer peaks of the filter media, providing an at least 50% open flow area, and providing a tight array of attachment points supporting the pleats in an appropriately spaced and non-collapsed condition;
   the support screen comprising a sheet of screen material having a width approximately equal to the axial dimension of the filter media;
   the filter element being characterized by the absence of cellulose-fiber and woven-mesh endoskeleton support layers in the filter media and by the absence of a support structure surrounding the support screen.

2. A filter element as set forth in claim 1, wherein the layers comprise an inner layer, an outer layer, and a filtration layer therebetween; and wherein the filter media has a density of about 8 or more pleats per inner diameter inch.

3. A filter element as set forth in claim 2, wherein the layers of the filter media consist essentially of the inner layer, the outer layer, the filtration layer.

4. A filter element as set forth in claim 2, wherein the inner layer is made of a non-woven polymer, the outer layer is made of a non-woven polymer, and the filtration layer is made of fiberglass or at least one polymer.

5. A filter element as set forth in claim 2, wherein the inner and outer layers each have a thickness of less than about 0.030 inches.

6. A filter element as set forth in claim 1, wherein the layers of the filter media consist essentially of an inner layer, an outer layer, and a filtration layer therebetween; and wherein the filtration layer is made of at least one of fiberglass, nylon, polyamide, polyester, polyethylene, polypropylene, or mixtures thereof, and wherein the inner and outer layers each have a thickness less than about 0.030 inches and are made of a non-woven polymer.

7. A filter element as set forth in claim 1, wherein support screen comprises a first set of cords extending in a first direction, a second set of cords extending in a second direction and intersecting with the first set of cords, and openings defined therebetween;
   wherein adjacent cords in the first set are separated from each other by a distance $d_1$, adjacent cords in the second set are separated from each other by a distance $d_2$, and adjacent radially-outer peaks are separated from each other by a distance $d_{pleat}$; and
   wherein the distance $d_1$ between the first set of cords is about half to about twice the distance $d_{pleat}$ between adjacent radially-outer peaks.

8. A filter element as set forth in claim 1, wherein the sheet of screen material has a length approximately equal to the circumferential dimension of the filter media plus a seam allowance and the support screen has lateral edges joined together at a side seam.

9. A filter element as set forth in claim 8, wherein the side seam extends substantially parallel to a longitudinal axis of the filter media.

10. A filter element as set forth in claim 8, wherein the lateral edges overlap and are thermally bonded together to form the side seam.

11. A filter element as set forth in claim 1, wherein the support screen is made of a PVC coated fiberglass mesh.

12. A filter element as set forth in claim 1, wherein the filter element is a microfilter element for removing impurities in the range of about 0.5 μm to about 25.0 μm from hydrocarbon fuel.

13. A filter element as set forth in claim 1, wherein the filter media is a coalescer element for removing free water and particulate from aviation fuel.

\* \* \* \* \*